No. 870,794. PATENTED NOV. 12, 1907.
H. E. NORRIS.
STEERING MECHANISM.
APPLICATION FILED DEC. 12, 1906.
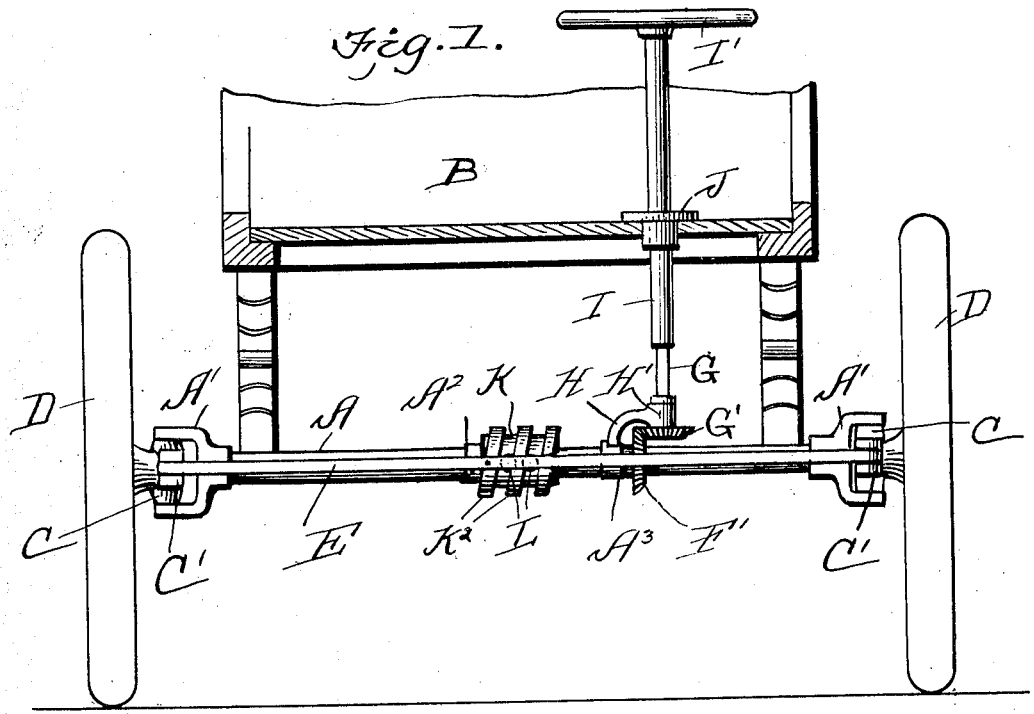
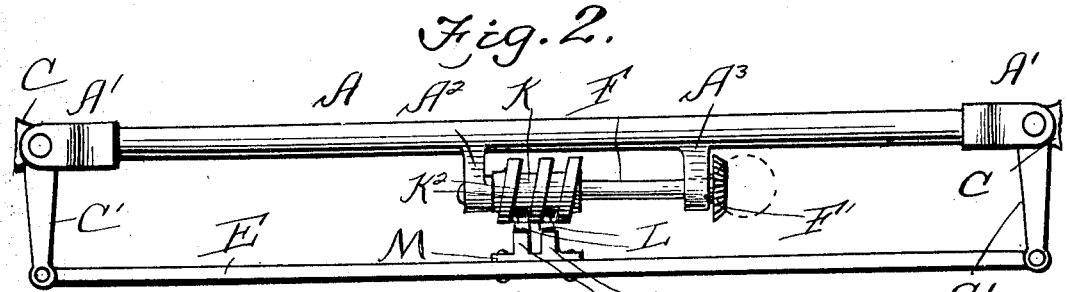
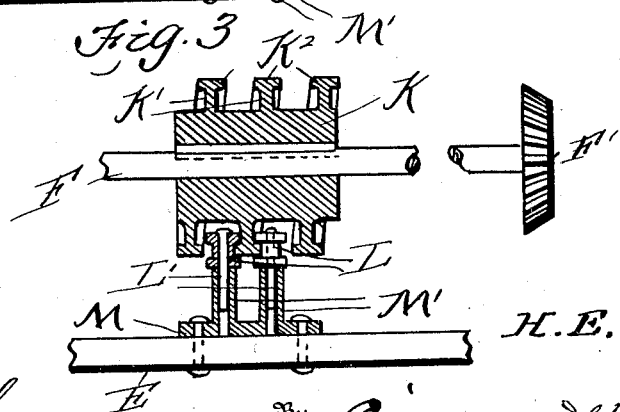
Inventor
H. E. Norris.
Witnesses

UNITED STATES PATENT OFFICE.

HARRY E. NORRIS, OF ARNOLD, OHIO.

STEERING MECHANISM.

No. 870,794.

Specification of Letters Patent.

Patented Nov. 12, 1907.

Application filed December 12, 1906. Serial No. 347,487.

*To all whom it may concern:*

Be it known that I, HARRY E. NORRIS, a citizen of the United States, residing at Arnold, in the county of Union and State of Ohio, have invented a new and useful Improvement in a Steering Mechanism, of which the following is a specification.

This invention relates to steering mechanism and more particularly to steering mechanism for motor vehicles, the object being to provide a steering mechanism that will be positively locked in position in which it is moved so as to prevent it from jerking, wabbling and edging when the wheels of the vehicle strike obstructions, thereby overcoming the difficulties now existing with steering mechanisms now in use.

With this and other objects in view, the invention consists in the novel features of construction, combination and arrangement of parts hereinafter fully described and pointed out in the claims.

In the drawing forming a part of this specification:—

Figure 1 is a vertical sectional view through a motor vehicle showing my improved steering mechanism attached. Fig. 2 is a plan view of the steering mechanism detached. Fig. 3 is a detail sectional view of the working gear.

Referring to the drawing A indicates the front axle and B the body of an ordinary motor vehicle. The axle A is provided with yokes A' at its end in which the wheel axles C are mounted provided with wheels D. Arms C' project forward from the axles C provided with the bifurcated apertured end in which the bar E is pivotally connected, all of which are of the ordinary construction.

Apertured lugs A², A³ project out from the forward side of the axle A in which a shaft F is mounted provided with a bevel gear F' at one end meshing with a bevel gear G' carried by a shaft G mounted in a sleeve H' of a bowed arm H carried by the axle A. The shaft G projects up through the bottom of the body of the vehicle and has a sleeve I secured therein which is mounted in a flanged collar J, secured in the bottom of the vehicle and is provided with an ordinary steering wheel I' at its upper end. Fixed on the shaft F adjacent the lug A² is a worm-wheel K, the spiral ribs K' of which are provided with outward-projecting flanges K² adapted to work in the grooved antifriction rollers L carried by pins L' mounted in outwardly projecting spaced sleeves M' of a plate M which is secured on the bar E by bolts. It will be readily seen that by turning the steering wheel the worm-gear K will be revolved causing the bar to move with it, which will steer the vehicle.

From the foregoing description it will be readily seen that I have provided a very simple and efficient steering mechanism which can be readily attached to the ordinary vehicle now in use.

Having thus fully described my invention, what I claim as new and desire to secure by Letters Patent is:—

1. In a steering mechanism, the combination with the connecting bar of the wheel axles, of a plate secured to said bar provided with outwardly projecting sleeves, pins mounted in said sleeves carrying anti-friction rollers and a worm-wheel carried by the main axle meshing with said rollers for the purpose described.

2. In a steering mechanism, the combination with the connecting bar of the wheel axles, of a plate secured to said bar provided with spaced sleeves, pins mounted in said sleeves provided with rollers, a worm-gear carried by the main axle meshing with said rollers and means for rotating said gear, for the purpose described.

3. In a steering mechanism, the combination with the main axle provided with forwardly projecting apertured lugs of a shaft mounted in said lugs provided with a worm-gear, rollers carried by the connected bar of the wheel, axle meshing with said gear and means for rotating said gear for the purpose described.

4. In a steering mechanism, the combination with a worm gear provided with a flange rib carried by the main axle, of grooved rollers carried by the connecting bar of the wheel, axles adapted to fit over said ribs of the gear, and means for rotating said gear for the purpose described.

5. The combination with a bar connecting the wheel-axles, of anti-friction rollers carried by said bar and a worm-gear carried by the main axle adapted to engage said rollers for the purpose described.

6. In a steering mechanism, the combination with a bar connecting the wheel axles, of anti-friction rollers carried by said bar, a worm wheel mounted in the main axle meshing with said rollers and means for operating said worm wheel for the purpose described.

7. In a steering mechanism, the combination with the connecting bar, of the wheel axles, of spaced anti-friction rollers carried by said bar and a worm wheel carried by the main axle, the rib of which extends between said rollers for the purpose described.

8. In a steering mechanism, the combination with wheel-axles provided with arms mounted in the ends of the main axle of a bar connecting said arms carrying anti-friction rollers, a worm gear mounted on the main axle meshing with said rollers and means for rotating said worm gear for the purpose described.

9. In a steering mechanism, the combination with the main axle of apertured lugs projecting out from said axle, a shaft mounted in said lugs provided with a gear at one end, an arm secured to said axle carrying a shaft provided with a gear meshing with said gear, a wheel connected to said shaft, a worm-gear fixed on the shaft mounted in the apertured lugs and spaced rollers carried by the bar connecting the axles meshing with said worm gear.

10. In a steering mechanism, the combination with the connecting bar, of the wheel axles, of a plate secured on said bar provided with outwardly projecting spaced sleeves, pins mounted in said sleeves provided with grooved rollers, a worm-gear carried by the main axle having a flanged rib working between said rollers and means for rotating said worm-gear for the purpose described.

11. In a steering mechanism, the combination with an axle provided with yokes at its ends, of wheel axles mounted in said yokes provided with forwardly projecting arms, a bar connecting said arms, a plate secured on said bar provided with spaced sleeves, pins mounted in said sleeves, grooved rollers mounted on said pins, lugs formed on said axle, a shaft mounted in said lugs provided with a bevel-gear wheel, a worm gear fixed on said shaft, the spiral ribs of which are provided with outwardly projecting flanges working in the grooves of the rollers and a bevel gear carried by the axle meshing with said bevel-gear for the purpose described.

HARRY E. NORRIS.

Witnesses:
H. K. ORMEROD,
FRANK S. MACDOWELL.